(12) United States Patent
Savage et al.

(10) Patent No.: US 8,196,812 B2
(45) Date of Patent: Jun. 12, 2012

(54) CONDUCTING MULTIPLE FINANCIAL TRANSACTIONS ON A SELF-SERVICE TERMINAL

(75) Inventors: John G. Savage, Fife (GB); Norman G. Taylor, Dundee (GB); Mark A. Shonebarger, Centerville, OH (US); Jonathan S. Black, Dundee (GB)

(73) Assignee: NCR Corporation, Duluth, GA (US)

( * ) Notice: Subject to any disclaimer, the term of this patent is extended or adjusted under 35 U.S.C. 154(b) by 225 days.

(21) Appl. No.: 11/608,427

(22) Filed: Dec. 8, 2006

(65) Prior Publication Data

US 2008/0140551 A1 Jun. 12, 2008

(51) Int. Cl.
*G06Q 40/00* (2006.01)

(52) U.S. Cl. ........................... 235/379; 235/380

(58) Field of Classification Search ............... 705/8, 35, 705/44; 235/379, 380
See application file for complete search history.

(56) References Cited

U.S. PATENT DOCUMENTS

| | | | | |
|---|---|---|---|---|
| 4,660,168 A | * | 4/1987 | Grant et al. | 705/8 |
| 4,692,600 A | * | 9/1987 | Takahashi | 235/379 |
| 5,250,788 A | * | 10/1993 | Sugai et al. | 235/379 |
| 5,546,523 A | * | 8/1996 | Gatto | 715/811 |
| 5,903,881 A | * | 5/1999 | Schrader et al. | 705/42 |
| 6,796,492 B1 | * | 9/2004 | Gatto | 235/379 |
| 7,419,091 B1 | * | 9/2008 | Scanlon | 235/379 |
| 2002/0038289 A1 | * | 3/2002 | Lawlor et al. | 705/42 |
| 2002/0069122 A1 | * | 6/2002 | Yun et al. | 705/26 |
| 2003/0080185 A1 | * | 5/2003 | Werther | 235/380 |
| 2005/0209958 A1 | * | 9/2005 | Michelsen et al. | 705/39 |
| 2006/0095610 A1 | * | 5/2006 | Arndt et al. | 710/52 |
| 2007/0164098 A1 | * | 7/2007 | Khalid et al. | 235/380 |

* cited by examiner

*Primary Examiner* — Thien M. Le
*Assistant Examiner* — Sonji Johnson
(74) *Attorney, Agent, or Firm* — Peter Priest

(57) ABSTRACT

A self-service terminal (SST) for use in conducting multiple financial transactions between a user of the SST and a financial institution includes one or more user-interface devices and a processing module. The user interface devices are configured to receive information from and provide information to the user. The processing module is configured to: (1) receive from the one or more user-interface devices information identifying a first one of the transactions and information containing details necessary to complete the first one of the transactions; (2) receive from the one or more user-interface devices information identifying a second one of the transactions and information containing details necessary to complete the second one of the transactions; and (3) thereafter initiate execution of the first one of the transactions and the second one of the transactions over a financial-transaction network.

20 Claims, 12 Drawing Sheets

AMOUNT TO PAY TO LOAN 1?  630

FROM WHICH ACCOUNT?  635

| CHECKING | —635₁ | BALANCE: $1,800.00 |
| SAVINGS | —635₂ | BALANCE: $2,000.00 |
| MONEY MARKET | —635₃ | BALANCE: $10,000.00 |

FIG. 6H

WOULD YOU LIKE TO DO ANOTHER TRANSACTION?  640

[ YES ]   [ NO ]

TRANSACTION 1:
    $500 DEPOSIT TO CHECKING
        BALANCE = $1800.00
TRANSACTION 2:
    $300 PAYMENT FROM
    CHECKING TO LOAN 1

HERE ARE THE DETAILS OF THE
TRANSACTIONS YOU REQUESTED:

1. $500 DEPOSIT TO CHECKING
2. $300 PAYMENT FROM CHECKING TO LOAN 1

WOULD YOU LIKE TO MAKE CHANGES?

YES   NO

WHICH TRANSACTION?

$500 DEPOSIT — $705_1$ $300 PAYMENT — $705_2$

WHAT WOULD YOU LIKE TO CHANGE?

AMOUNT OF DEPOSIT

DEPOSIT ACCOUNT

730

PLEASE WAIT
WHILE WE PROCESS
YOUR TRANSACTIONS ...

FIG. 7G

CONDUCTING MULTIPLE FINANCIAL TRANSACTIONS ON A SELF-SERVICE TERMINAL

BACKGROUND

The traditional metaphor for execution of financial transactions in self-service terminals, such as automated banking machines (ABMs) or automated teller machines (ATMs), is a very simple one. Each financial transaction conducted on the self-service terminal (SST) includes three primary stages: (1) a selection stage, during which the user of the SST identifies the type of transaction to be executed; (2) a data-entry stage, in which the user provides key information required to carry out the transaction (e.g., an amount of cash to be withdrawn from a selected banking account); and (3) a fulfillment stage, in which the SST authorizes the transaction through a financial network and then completes the transaction (e.g., dispenses the requested amount of cash) for the user.

Each of the transaction types that are supported by the SST is atomic and is independent of any other type of transaction supported by the SST. As a result, traditional SSTs execute transactions in a sequential manner, even when a single user wishes to conduct multiple transactions in a single session, and even when the transactions are of the same type and involve the same user-interface module on the SST. For example, if a user wants to conduct two cash-dispense transactions from two separate banking accounts, the traditional SST treats the transactions as two atomic transactions, gathering data from the user about the first cash-dispense transaction and fulfilling that transaction (i.e., dispensing the requested cash) before it gathers any data from the user about the second cash-dispense transaction.

This simple transaction metaphor, for the most part, has been sufficient for the types of transactions offered by SSTs up to now. However, as the customers of financial institutions become more sophisticated, the institutions are being pushed to provide ever-more complex services on SSTs, services that are typically very difficult, if not impossible, to provide on traditional SSTs.

SUMMARY

Described below is a self-service terminal (SST) for use in conducting multiple financial transactions between a user of the SST and a financial institution over a financial-transaction network. The SST includes one or more user interface devices configured to receive information from and provide information to the user. The SST also includes a processing module configured to: (1) receive from the one or more user-interface devices information identifying a first one of the transactions and information containing details necessary to complete the first one of the transactions; (2) receive from the one or more user-interface devices information identifying a second one of the transactions and information containing details necessary to complete the second one of the transactions; and (3) thereafter initiate execution of the first one of the transactions and the second one of the transactions over the financial-transaction network.

Other features and advantages will become apparent from the description and claims that follow.

BRIEF DESCRIPTION OF THE DRAWINGS

FIGS. 6A through 6J show a graphical user interface through which an SST like that of FIG. 1 interacts with a user in conducting multiple financial transactions at once.

FIGS. 7A through 7G also show a graphical user interface through which an SST like that of FIG. 1 interacts with a user in conducting multiple financial transactions at once.

DETAILED DESCRIPTION

Figure 1:
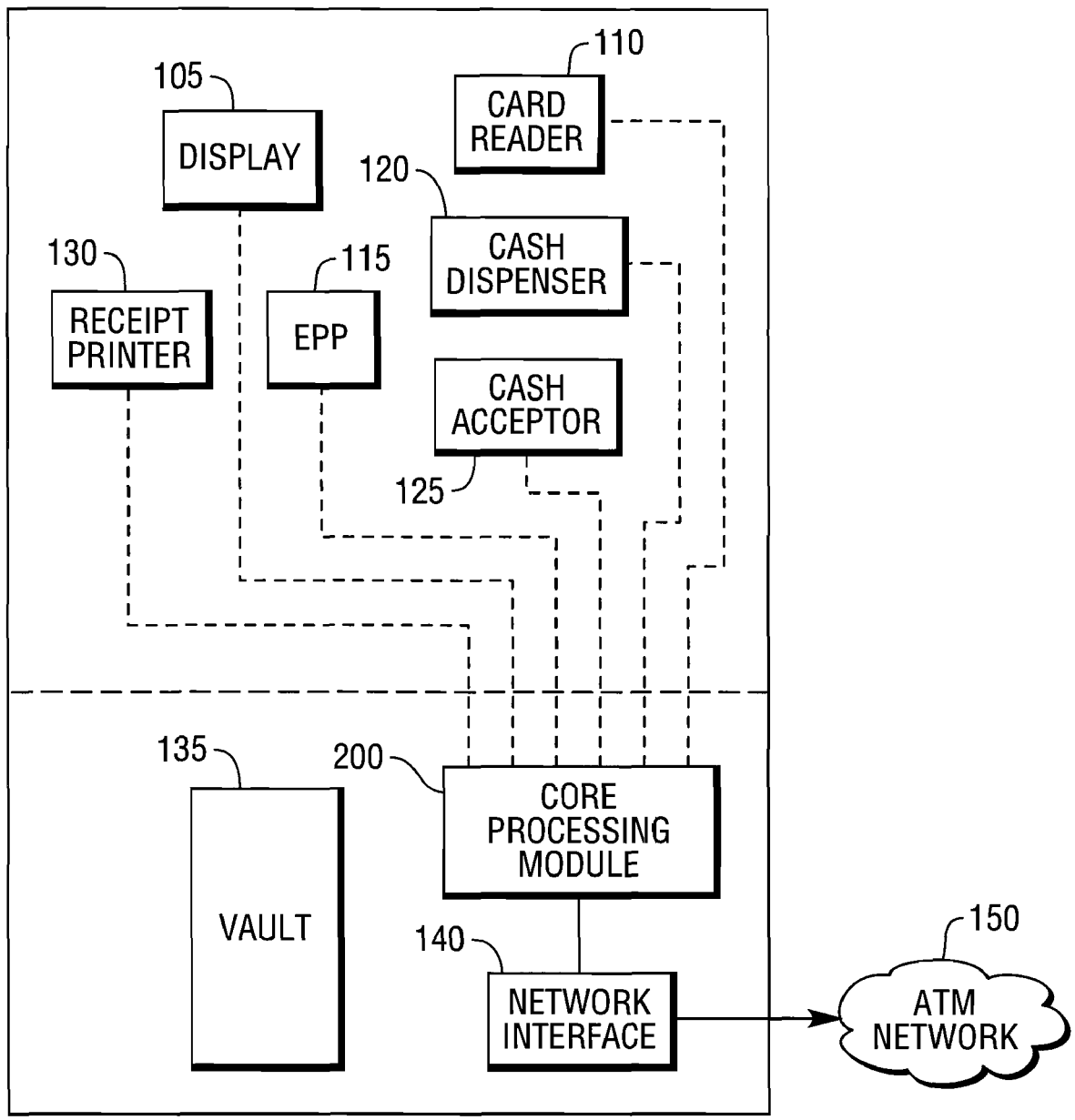
FIG. 1 is diagram showing components of a self-service terminal (SST) that allows a user to conduct multiple financial transactions at once.

FIG. 1 shows a self-service terminal (SST) 100 that allows a user to conduct multiple financial transactions at once. In doing so, the SST 100 conducts the "selection" and "data-entry" stages (described above) for each transaction that the user wishes to execute before conducting the "fulfillment" stage for any of the transactions. The SST 100 also displays for the user the effects that each transaction will have on the user's financial accounts before any of the transactions are fulfilled. In some cases, the SST 100 also allows the user to amend any or all of the requested transactions before fulfilling the transactions. This approach gives the user a "big picture" view of the impact that the series of transactions will have before the user commits to the transactions. It also allows the SST 100 to consolidate certain functions that are repeated amongst multiple transaction into a single function of that type (e.g., conducting single cash-dispense operation when the user requests multiple cash-dispense transactions), as described in more detail below.

From the viewpoint of the user, the SST 100 of FIG. 1 on first approach appears very similar to a traditional self-service terminal. For a terminal that is used to conduct financial transactions, such as deposit and withdrawal transactions to banking accounts, the SST 100 includes a variety of user-interface modules. These user-interface modules typically include a video-display module 105, a card-reader module 110, an encrypted-pin-pad (EPP) module 115, a cash-dispenser module 120, a deposit-acceptor module 125, and a receipt-printer module (130). In many cases, the SST 100 will include other user-interface components, such as a biometric-identification module and an audio-output module, as well. The SST 100 also includes several traditional internal components, such as a vault 135 and a network-interface module 140, where the latter allows the SST 100 to interact with a financial-transaction network 150 (such as an ATM network) through which the SST 100 authorizes and fulfills the financial transactions requested by the user.

Figure 2:
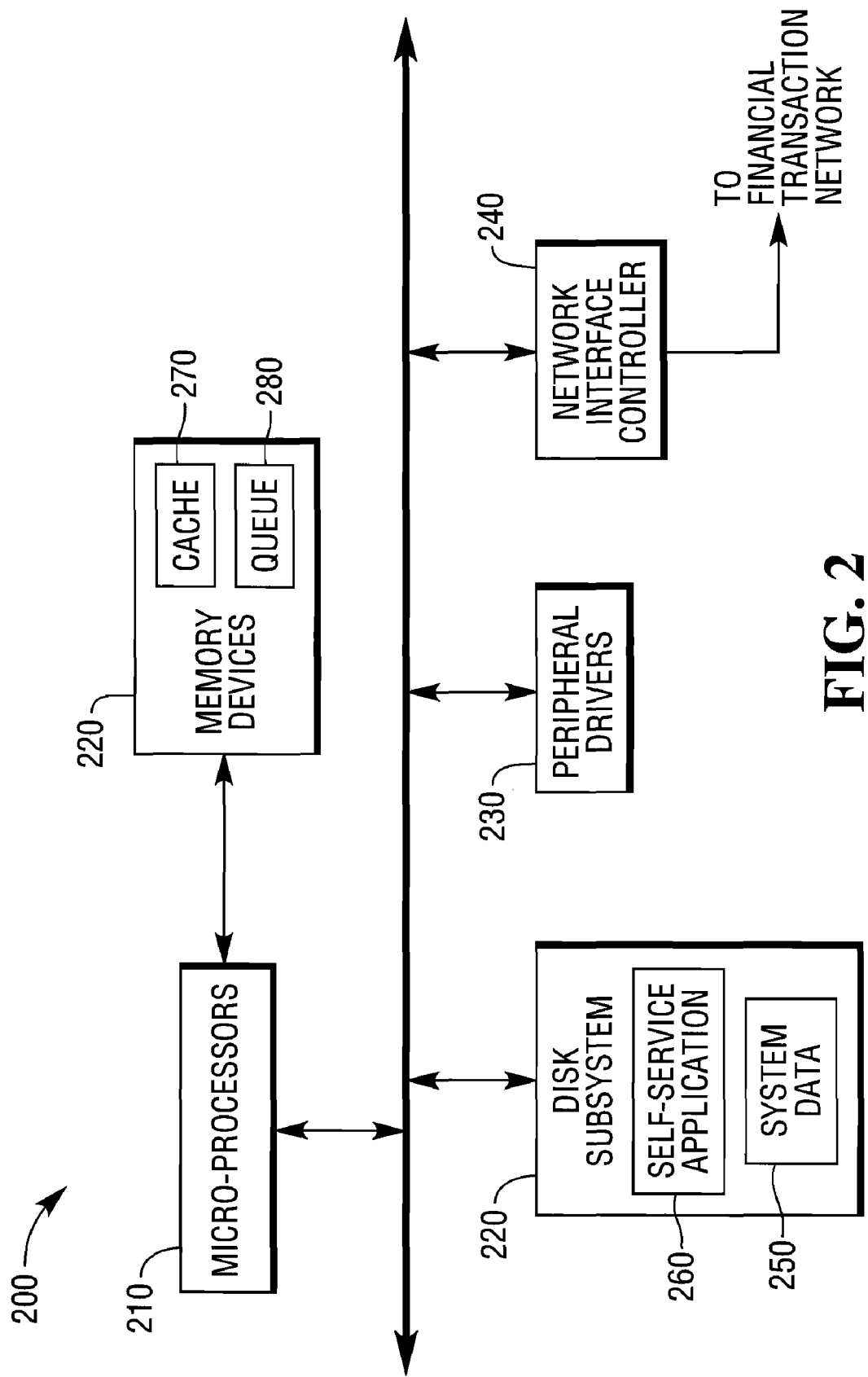
FIG. 2 is a schematic diagram showing components of a processing unit of the SST of FIG. 1.

The SST 100 also includes a core-processing module 200 that includes, among other things, the computer hardware and software components required to allow the SST 100 to engage in financial transactions with the user. FIG. 2 shows the core-processing module 200 in more detail. The core-processing module 200 is typically implemented as a general-purpose computer system programmed to guide all other SST components as they interact with the user and the financial-transaction network. As shown here, the core-processing module 200 includes one or more microprocessor devices 210 that control one or more memory devices 220 used for run-time storage of critical data and that execute the SSTs operating system. The core-processing module 200 also includes one or more disk-storage subsystems 220 for persistent data storage, as well as device drivers 230 that allow the core-processing module to control operation of the user-interface modules described above. The core-processing module 200 also includes a network-interface component 240 that controls operation of the network-interface module described above.

The disk-storage storage subsystem 220 is used, among other things, to provide persistent storage both for system data 250 that is critical to the operation of the SST 100 and for one or more self-service applications 260, which are computer programs that guide the SST's operation as it assists the user in conducting financial transactions. In most systems, each self-service application 260 includes executable code that is loaded into the memory devices 220 at run-time and executed by the microprocessor devices 210.

Figure 3:
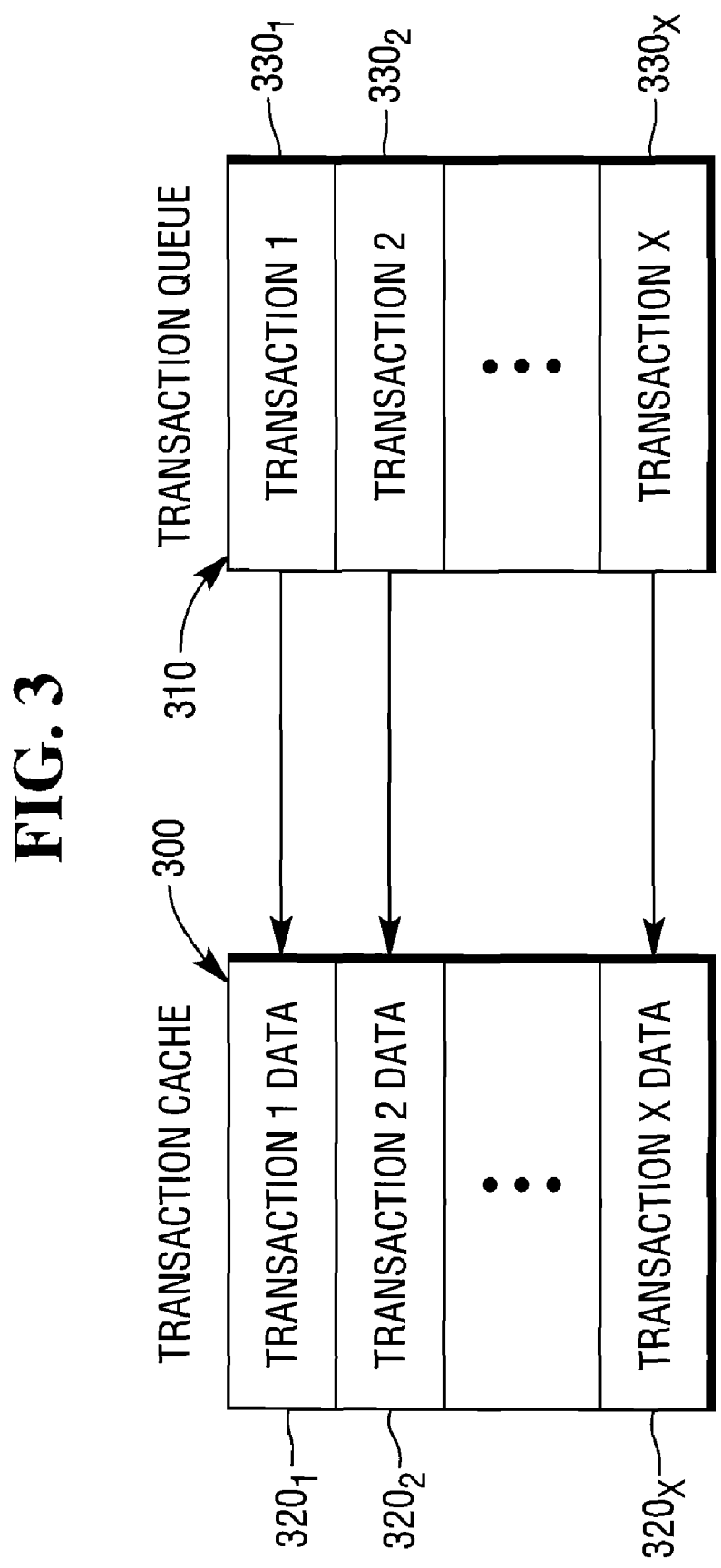
FIG. 3 is a diagram showing a transaction cache and a transaction queue in the SST of FIG. 1.

Within the memory devices 220, the microprocessor devices 210 maintain a transaction cache 300 and a transaction queue 310, which together enable the SST 100 to engage the user in multiple transactions at once. FIG. 3 shows the transaction cache 300 and the transaction queue 310 in more detail. During the "selection" and "data entry" stages of each transaction that the user wishes to conduct, as the user enters data (e.g., account selections and deposit/withdrawal amounts) that is critical to that transaction, the core-processing module 200 places the data in a transaction-specific storage space $320_{1 \ldots X}$ that is dedicated to the transaction. For example, if the user wants to conduct two transactions during a single session, data critical to the first of those transactions is stored in one dedicated transaction-specific storage space $320_1$, and data critical to the second of those transactions is stored in another dedicated transaction-specific storage space $320_2$.

Likewise, each of the transactions that the user wishes to conduct are stored in the transaction queue 310 during the "selection" and "data entry" stages for each transaction. In the example above, when the SST 100 receives indication that the user wants to conduct a first transaction, a first entry $330_1$ is created at the top of the queue 310 for the first transaction. When the SST 100 subsequently learns that the user wants to conduct a second transaction, a second entry $320_2$ is created in queue for the second transaction, immediately behind the first entry $330_1$. As described below, the transactions remain in the transaction queue 310 and none of the transactions are executed until the user has completed the "selection" and "data entry" stages for all transactions and has instructed the SST 100 to fulfill the transactions.

Within each of its entries $330_{1 \ldots X}$, the transaction queue 310 stores a pointer to the corresponding transaction-specific storage space $320_{1 \ldots X}$ that holds the data critical to that transaction. Upon completion of the "selection" and "data entry" stages for all transactions, the SST 100 authorizes the transactions by interacting with the financial-transaction network in the same manner that traditional SSTs interact with the network. In particular, the SST 100 submits the transactions to the network for authorization in a sequential manner, using the transaction queue 310 to identify the transaction that is next due for authorization and to retrieve the data that is critical to that transaction. As it receives authorization for each transaction, the core-processing module 200 operates as described below to accumulate information about transactions of similar types and to fulfill all transactions of similar type at once.

Figure 4:
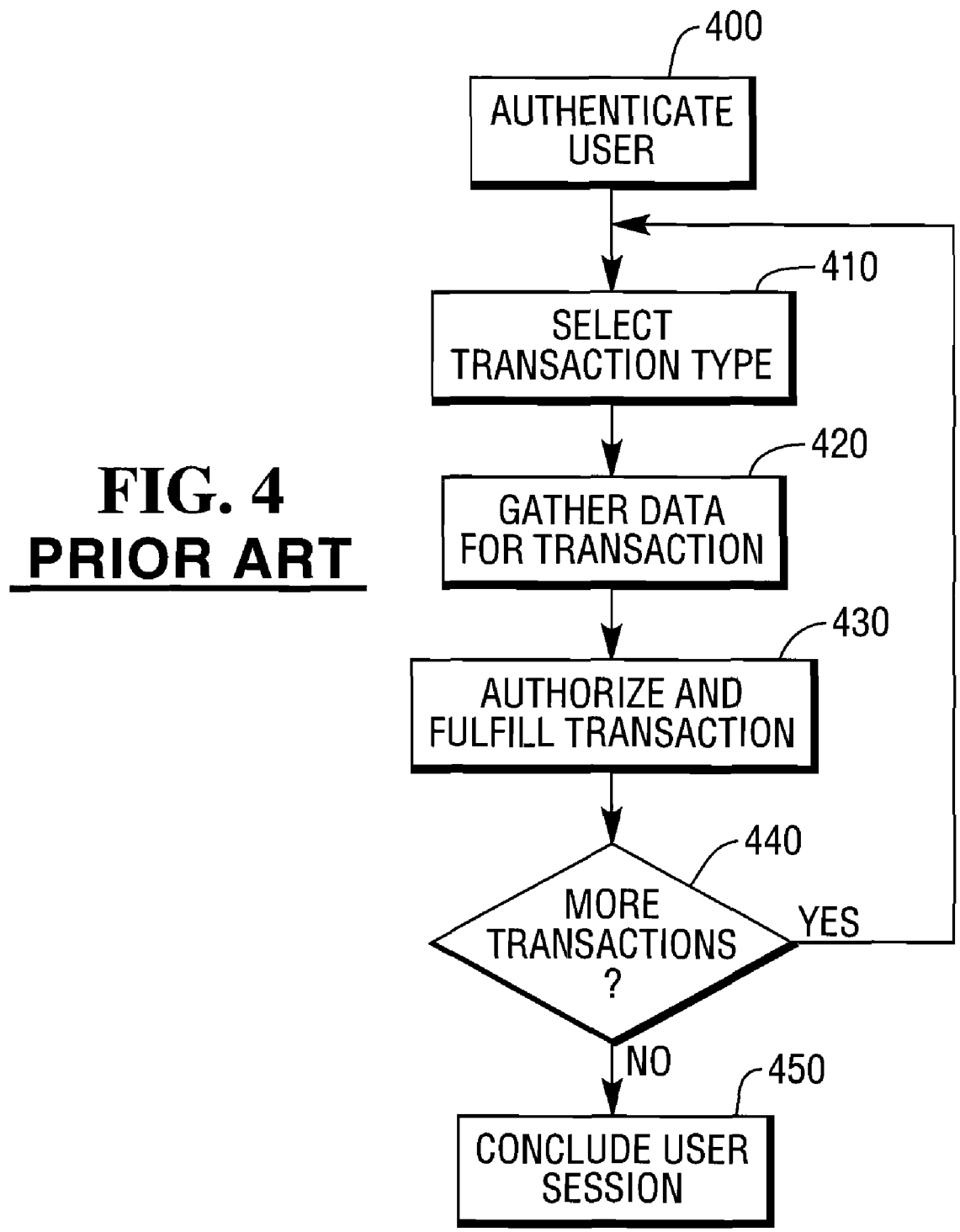
FIG. 4 is a flow diagram for the execution of multiple financial transactions in a traditional SST.

FIG. 4 is a flow diagram for the execution of multiple transactions in a sequential manner, as is done in traditional SSTs. A user session begins when a user engages a user-authentication mechanism (such as the card-reader and EPP modules described above) and the SST authenticates the user (step 400). The SST then enters the "selection" stage during which the user identifies the type of transaction to be conducted (step 410). The SST then enters the "data entry" stage during which the user provides the data critical to the transaction (step 420). The SST then enters the "fulfillment" stage during which it authorizes the requested transaction through the financial-transaction network and fulfills the transaction (e.g., dispenses cash, receives a deposit, transfers funds) for the user (step 430).

After fulfilling the first transaction, the SST asks the user whether another transaction is desired (step 440). Upon receiving indication that a second transaction is desired, the SST returns to the "selection" stage in which the user identifies type of transaction desired (step 410). As before, the SST then enters the "data entry" stage in which the user provides the data critical to the second transaction (step 420). The SST then enters the "fulfillment" stage again, during which it authorizes and fulfills the second transaction (step 430). The SST then asks once again whether the user wants to conduct another transaction (step 440) and, if so, repeats each of these steps again.

When the user finally indicates that no further transactions are desired, the SST concludes the user session (step 450). Concluding the user session often involves a wide variety of tasks, such as printing a receipt, engaging the user in a questionnaire, and returning the user's bank card. In any case, the SST concludes the user's session only after it has conducted all of the requested transactions in a sequential manner, each time conducting all three stages of a transaction (selection, data entry and fulfillment) before starting the next transaction.

Figure 5:
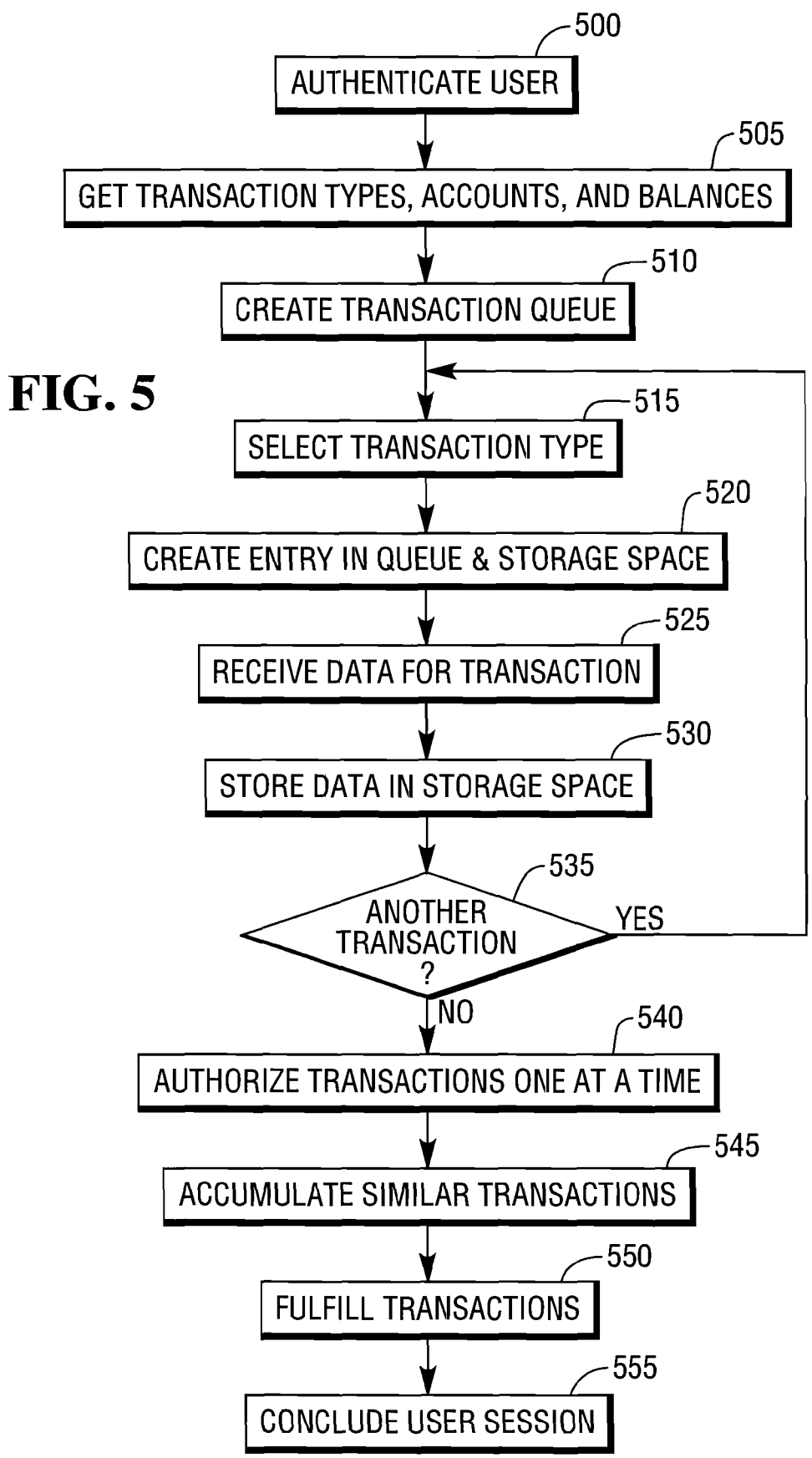
FIG. 5 is a flow diagram for the execution of multiple financial transactions in an SST like that of FIG. 1.

FIG. 5 is a flow diagram for the execution of multiple transactions at once in the SST 100 of FIG. 1. As with a traditional SST, a user session begins in the SST 100 of FIG. 1 when a user engages the SST's user-authentication mechanism and the SST authenticates the user (step 500). Upon authenticating the user, the SST 100 accesses the financial-transaction network to identify the types of transactions available to the user and the user accounts for which these transactions are available, as well as the current balance for each of these accounts (step 505). The SST 100 stores this user-specific information in an easily accessible location, typically in the run-time memory devices described above.

The SST 100 then creates a transaction queue like that described above (step 510), and enters the "selection" stage described above. In the selection stage, the SST 100 presents to the user, through its video display, a list of the types of transactions available to the user and receives from the user an indication of the type of transaction to be conducted (step 515). Upon receiving the user's selection, the SST 100 creates an entry in the transaction queue and a transaction-specific storage space that both correspond to the requested transaction (step 520).

The SST 100 then enters the "data entry" stage during which, through a series of visual displays and user actions, the SST 100 receives the data critical to the transaction (step 525). This data often includes, for example, an indication of the account(s) to be debited/credited and the amount of the debit/credit. Upon receiving the data critical to the transaction, the SST 100 stores all of this data, including data identifying the transaction type, in the transaction-specific storage space created for the transaction (step 530).

The SST 100 then asks the user, before fulfilling the transaction, whether the user would like to conduct another transaction (step 535). If so, the SST 100 returns to the "selection" stage and receives from the user an indication of the type for the second transaction (step 515). As before, the SST 110 then creates an entry in the transaction queue and a transaction-specific storage space that both correspond to the second transaction (step 520). The SST 100 then re-enters the "data entry" stage and receives from the user the data critical to the transaction (step 525), storing all of this data in the corresponding transaction-specific storage space (step 530). The SST 100 then asks the user once again whether the user would like to conduct another transaction (step 535). If so, the SST 100 repeats these steps, adding to the transaction queue and creating new transaction-specific storage space(s), until the user indicates that no more transactions are desired.

In some systems, as the user enters data for each of the transactions, the SST 100 presents on its visual display a running tally of all requested transactions and the effects the transactions will have on account balances, using the account data stored in the memory devices when the user session began. This feature is described in more detail below.

When the user has indicated that no additional transactions are desired, the SST 100 enters an "authorization" stage, during which it accesses the financial-transaction network and submits the queued transactions for authorization (step 540). With existing financial-transaction networks, the SST 100 submits the transactions for authorization one transaction at a time. The result is that, for existing networks, the SST 100 accesses the transaction queue and retrieves, in a sequential manner, the data critical for each transaction, receiving authorization for one transaction before proceeding to the next transaction in the queue.

In some systems, however, the SST 100 reorders the transactions in the transaction queue (step 540A) before submitting them for authorization. Reordering transactions is useful, for example, when the user has entered the transactions in an order that might cause them to fail if they are executed in that order. As an example, assume that the user first requests a $200 cash withdrawal from an account with an existing balance of $100 and then requests a $150 deposit to the same account. If the withdrawal transaction were delivered for authorization before the deposit transaction, the withdrawal transaction would be denied for insufficient funds. If, on the other hand, the SST 100 were to submit the deposit transaction first, the user's account balance would climb to $250 before the withdrawal transaction were submitted, and the withdrawal transaction in that case would execute successfully. In systems configured to reorder transactions in this manner, the SST 100 includes programmable logic, executable by the core processing module of FIG. 1, that implements reordering rules selected by the owner or operator of the SST.

Alternatively, as financial-transaction systems evolve, the transaction hosts that authorize transactions will develop the capability to receive batch authorization requests from SSTs. In some of these systems, the reordering logic will reside in the transaction hosts, and the reordering of transactions will take place in the hosts as well as in the SSTs.

As the SST 100 receives authorization for each transaction, it searches the data for the previously authorized transactions to identify transactions of similar type. If transactions of similar type exist, the SST 100 accumulates (typically in the memory devices) the net result of these transactions (step 545) so that it can fulfill all of the transactions at once. For example, if the user has requested two cash-dispense transactions from two separate accounts, each for an amount of $250, the SST 100 accumulates the two transactions into a single cash-dispense transaction in the amount of $500. Likewise, if the user has requested two deposit transactions to two separate accounts, the SST 100 accumulates these transactions and allows the user to submit two deposit envelopes in a single deposit-acceptor operation. The result is that the SST 100 requires the user to interact only once with certain user-interface modules (e.g., cash-dispense and deposit-acceptor modules) during each user session.

After the SST 100 has authorized all of the transactions requested by the user, the SST 100 enters a "fulfillment" stage in which it fulfills each of the transactions for the user (step 550). As described above, the SST 100 fulfills at once all transactions of similar type that were accumulated during the "authorization" stage. Upon fulfilling all of the user's requested transactions, the SST 100 concludes the user's session in a manner similar to that of the traditional SST (step 555).

FIGS. 6A through 6J show a series of displays in a graphical user interface that together provide one example of an interaction between the SST 100 of FIG. 1 and a user. Upon authenticating the user and receiving information about the user's accounts and available transactions types from the financial-transaction network, the SST 100 enters the "selection" stage and creates a display 600 like that of FIG. 6A, in which it presents to the user a list of the types of transactions available to the user. In this example, the user can conduct four types of financial transactions: a cash withdrawal $600_1$, a cash deposit $600_2$, a transfer of funds $600_3$ between accounts, and a cash payment $600_4$ of the balance due, e.g., on a loan account.

Figure 6A:
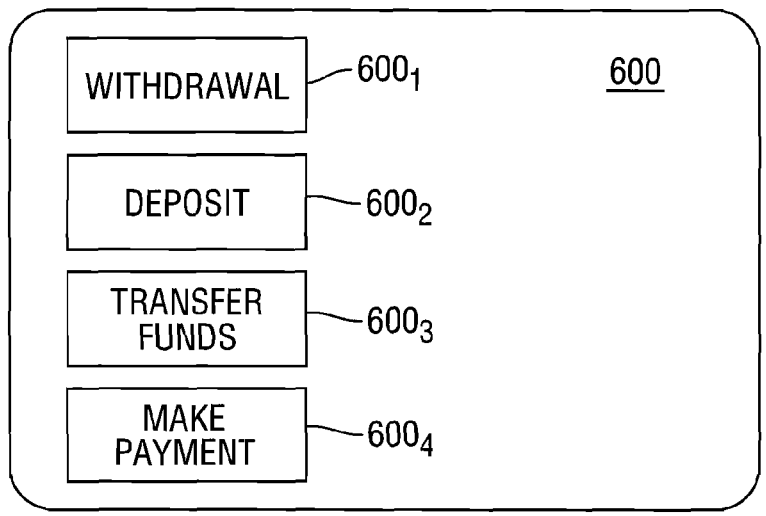
Figure 6B:
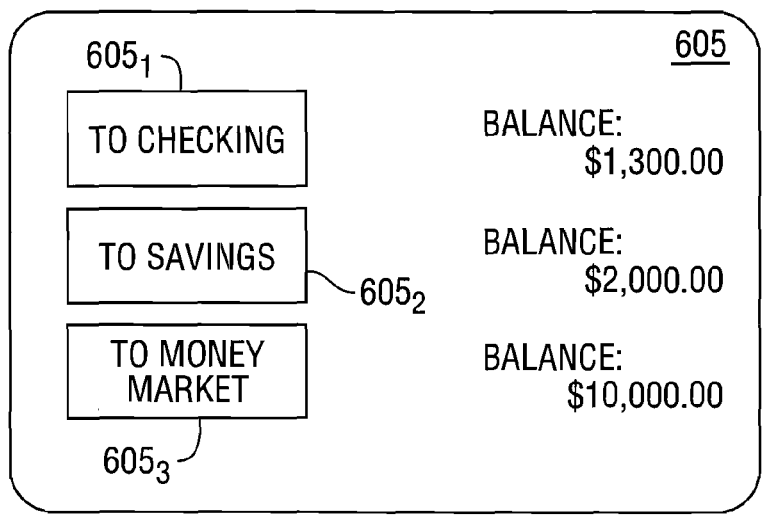

By actuating a user-input element, such as a button located near the SST's video display or a soft key on a touch-screen display, the user selects the type of transaction to be conducted ("Deposit" in this example). This in turn causes the SST 100 to enter the "data entry" stage, in which it creates a display 605 like that of FIG. 6B, presenting the user with a list of accounts to be involved in the transaction. In this example, the user can choose to make a cash deposit to any of three accounts: a "Checking" account $605_1$, a "Savings" account $605_2$, and a "Money Market" account $605_3$.

Figure 6C:
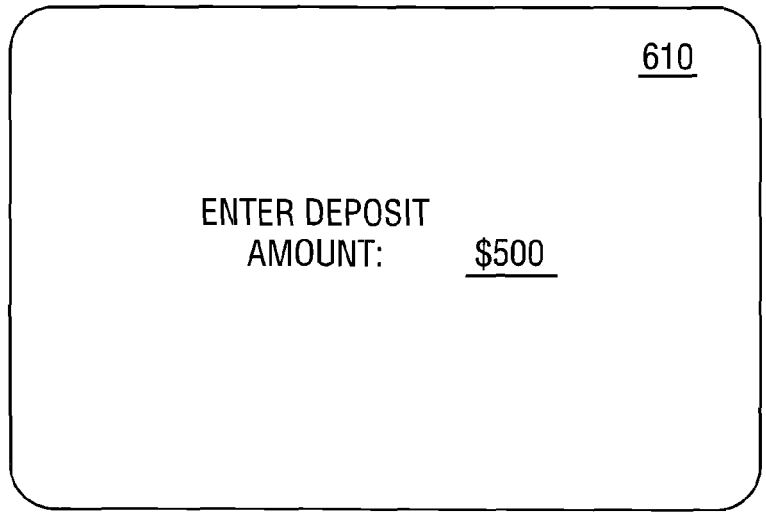
Figure 6D:
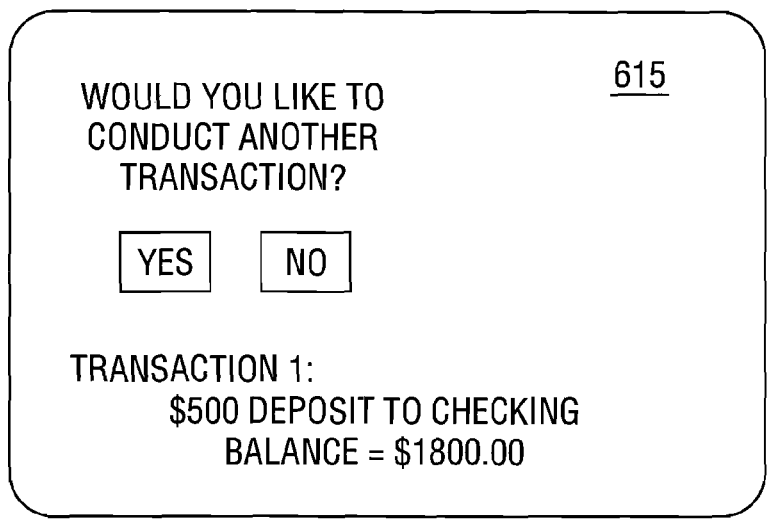
Figure 6E:
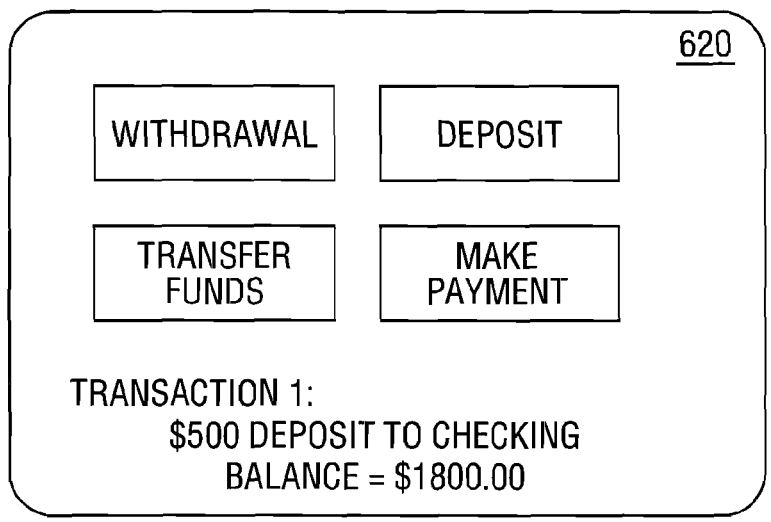

Once again, the user makes a selection ("Checking" in this example) by actuating an appropriate user-input element, and the SST 100 responds by creating a display 610 like that of FIG. 6C, in which the SST 100 instructs the user to enter the amount of money involved in the transaction (the total amount for deposit in this example). The user typically enters the amount pressing numbered keys on the SST's key pad, at which point the SST 100 exits the "data entry" mode for this first transaction and creates a display 615 like that of FIG. 6D, asking the user whether another transaction is desired. In some cases, the SST 100 also presents on the display 615 a summary of the first transaction requested by the user and the affect that this transaction will have on the user's account balances. In the example of FIG. 6D, the display 615 shows that the user has requested a $500 deposit to the "Checking" account and that, upon completion, this transaction will leave a balance of $1800 in the "Checking" account.

At this point, the user indicates whether another transaction is desired. If not, the SST 100 enters the "authorization" stage and then the "fulfillment" stage, during which it completes the requested transaction. If, on the other hand, the user does request another transaction, the SST 100 re-enters the "selection" stage and creates a display 620 like that of FIG. 6E. This display 620 is very similar to the display 600 of FIG. 6A, in that it once again presents to the user a list of the types of transactions available to the user. At this point, however, the display 620 also provides a summary of all queued transactions (a $500 deposit to checking in this example).

Figure 6F:
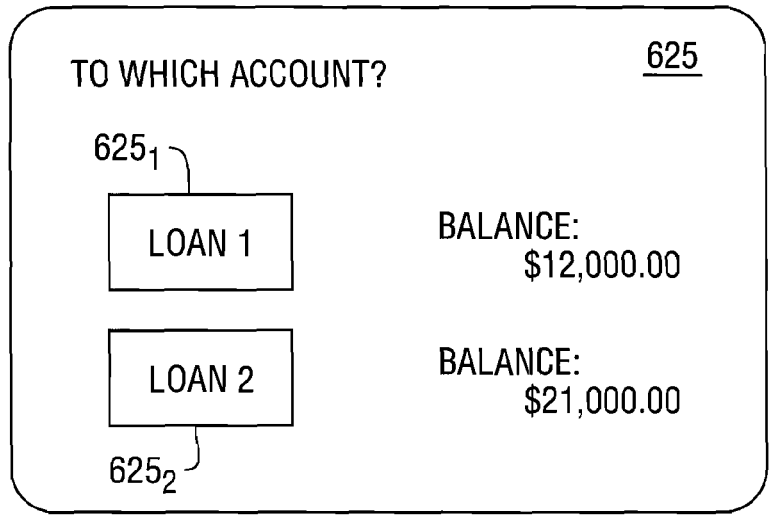
Figure 6J:
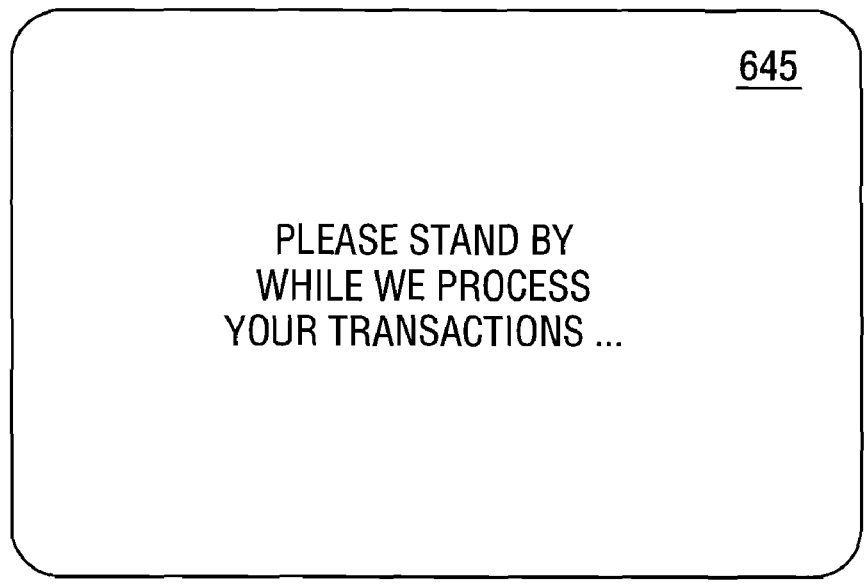
Figure 7D:
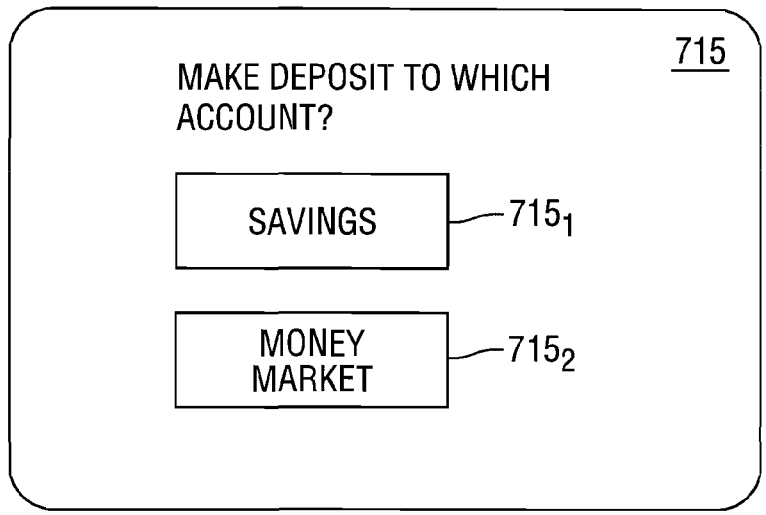
Figure 7E:
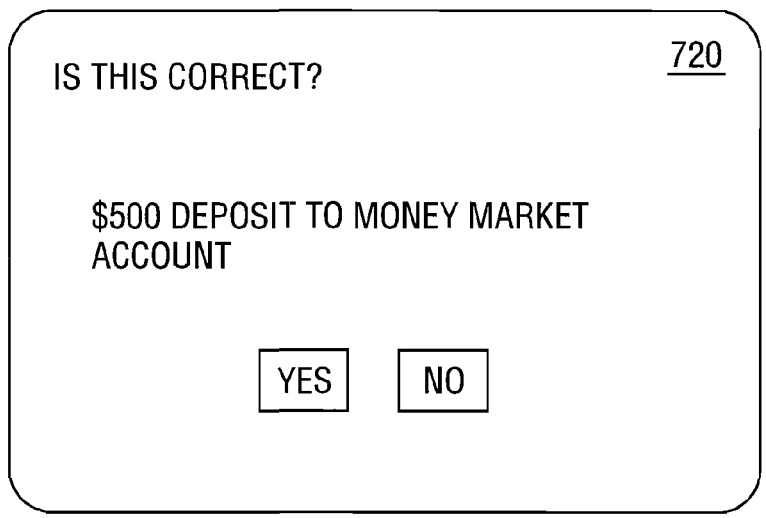
Figure 7F:
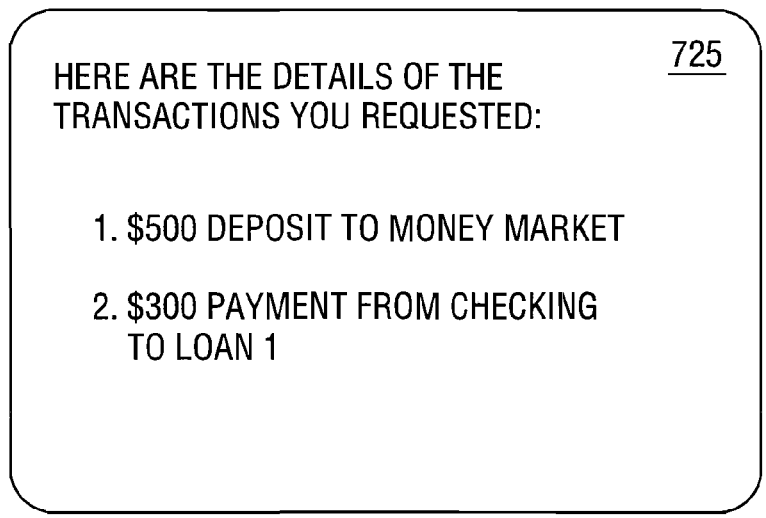

Once the user has selected the type of transaction to be conducted ("Make a Payment" in this example), the SST 100 enters the "data entry" stage for this transaction, creating a display 625 like that of FIG. 6F that presents the user with a list of accounts to be involved in the transaction. In this example, the user has two loan accounts—a "Loan 1" account 625₁ and a "Loan 2" account 625₂—to which a payment can be made. In some cases, the display 625 also presents the current balance on each of the accounts presented to the user.

As before, the user selects one of the accounts to be involved in the transaction ("Loan 1" in this example), and the SST 100 in turn creates a display 630 like that of FIG. 6G, in which it instructs the user to enter an amount for the transaction. Upon receiving the amount keyed in by the user ($300 in this example), the SST 100 then creates a display 635 like that of FIG. 6H, in which it asks the user which account is to be used to make the payment to the "Loan 1" account and displays a list of available accounts. In this example, the user can select from among three options: the "Checking" option 635₁, the "Savings" option 635₂, and the "Money Market" option 635₃. In some cases, the display 635 also presents to the user the current balance in each of the accounts available for selection. In this example, the balance shown for the "Checking" account ($1800) is the balance as it will stand after the deposit transaction has been fulfilled. In other systems, however, the SST 100 might show the balance as it stands before the deposit transaction is fulfilled, depending on the configuration selected by the SST's owner.

Once again, the user makes a selection ("Checking" in this example) by actuating an appropriate user-input element, and the SST 100 responds by exiting the "data entry" stage for this second transaction and creating a display 640 like that of in FIG. 6I, in which the SST 100 once again asks the user whether another transaction is desired. If the user requests yet another transaction, the SST 100 repeats the steps above, instructing the user select a transaction type and enter the pertinent account and amount data as described.

If, on the other hand, the user indicates that no more transactions are desired, the SST 100 enters the "authorization" and "fulfillment" stages, during which it completes the requested transactions. As the SST 100 enters the "authorization" stage, it creates a display 645 like that of FIG. 6J, in which it instructs the user to "stand by" while the transactions are authorized and fulfilled. Depending on the configuration chosen by the SST's owner, the SST 100 might create any number of other displays as it authorizes and fulfills the transactions and then concludes the user session.

In some systems, the SST 100 is configured to allow the user to amend the requested transactions before the SST 100 enters the "authorization" and "fulfillment" stages. FIGS. 7A through 7G shows a series of displays through which this amendment of transactions takes place. When the user has indicated in the display 640 of FIG. 6I above that no further transactions are desired, the SST 100 creates a display 700 like that of FIG. 7A, in which it presents a summary of the transactions requested by the user and asks the user if any changes need to be made to the queued transactions.

When the user indicates that a change is necessary, the SST 100 creates a display 705 like that of FIG. 7B, in which it asks the user which transaction to amend. In this example, the user has two choices: (1) the $500 deposit to checking (705₁), and (2) the $300 payment from checking to the "Loan 1" account (705₂). When the user has selected one of the transactions for amendment (the $500 deposit in this example), the SST 100 creates a display 710 like that of FIG. 7C, in which it asks the user which portion of the transaction needs amendment. In this example, the user can choose to amend the amount of the deposit (currently $500) or the account to be credited (currently "Checking").

When the user has selected which portion of the transaction to amend (the deposit account in this example), the SST 100 creates a display 715 like that of FIG. 7C, in which it asks the user to specify the desired amendment. In this example, the user must choose another account to which the deposit will be made and is presented with two options: (1) the "Savings" option 715₁ and (2) the "Money Market" option 715₂. When the user has made a selection ("Money Market") in this example, the SST 100 creates a display 720 like that of FIG. 7E, in which it asks the user to confirm the changes made to the transaction.

When the user has confirmed the changes, the SST 100 responds by creating a display 725 like that of FIG. 7F, in which it once again presents a summary of the queued transactions, as amended, and asks the user if any further amendments are necessary. If the user chooses to make further amendments, the SST 100 repeats the steps above, instructing the user to select the transaction to be amended and to enter the necessary changes. When the user is satisfied that the details of all queued transactions are correct, the user indicates that no further amendments are necessary, and the SST 100 enters the "authorization" and "fulfillment" stages. As described in reference to FIG. 6J above, the SST 100 creates a display 730 like that of FIG. 7G as it enters the "authorization" stage, instructing the user to stand by while the transactions are authorized and fulfilled. As described above, the SST 100 might also create any number of other displays as it authorizes and fulfills the transactions and then concludes the user session, depending on the configuration chosen by the SST's owner.

We claim:

1. A self-service terminal (SST) for use in conducting multiple financial transactions between a user of the SST and a financial institution over a financial-transaction network, the SST comprising:
   one or more user-interface devices configured to receive information from and provide information to the user; the user interface devices including a user authentication device for authenticating the user once during a user session in which the user provides transaction information relating to multiple financial transactions, a card reader, a deposit acceptor, and a receipt printer;
   a processing module configured to:
   control the user-interface devices so as to receive selection of a first transaction by the user relating to a first account of the user and entry of details necessary to complete the first transaction including selection of the first account and a transaction amount, followed by a selection of a second transaction by the user relating to a second account of the user and entry of details necessary to complete the second transaction before fulfillment of the first transaction; and
   upon an input from the user indicating that no additional information relating to the first and second transactions is to be entered, authorizing and completing the first and second financial transactions.

2. The SST of claim 1, further comprising a cash dispenser, a display, and one or more storage devices configured for temporary storage of information, where the processing module is configured to deliver the information identifying the first one of the transactions and the information containing details necessary to complete the first one of the transactions to the one or more storage devices for temporary storage before execution of the first one of the transactions has begun.

3. The SST of claim 2, where the one or more storage devices are configured to maintain a transaction queue to indicate that the first one of the transactions and the second one of the transactions are awaiting execution.

4. The SST of claim 3, where the transaction queue includes an entry for the first one of the transactions that comprises a pointer to a storage location for the information necessary to complete the first one of the transactions.

5. The SST of claim 4, where the transaction queue also includes an entry for the second one of the transactions that comprises a pointer to a storage location for the information necessary to complete the second one of the transactions.

6. The SST of claim 2, where the processing module is configured to deliver the information identifying the second one of the transactions and the information containing details necessary to complete the second one of the transactions to the one or more storage devices for temporary storage before execution of the first one of the transactions has begun.

7. The SST of claim 1, where the processing module is configured to receive from the one or more user-interface devices an instruction to amend one or more details of at least one of the transactions before initiating execution of any of the transactions.

8. The SST of claim 7, where the processing module is also configured to receive from the one or more user-interface devices information identifying the one or more details to be amended.

9. The SST of claim 1, where the processing module is configured to:
receive from the financial-transaction network information identifying one or more types of transactions available to the user; and
deliver this information to the one or more user-interface devices for presentation to the user before receiving the information identifying the first one of the transactions to be conducted.

10. The SST of claim 1, where the processing module is configured to:
receive from the financial-transaction network information identifying one or more financial accounts owned by the user and a current balance for each of the accounts; and
deliver this information to the one or more user-interface devices for presentation to the user as the user is entering the information containing details necessary to complete the first one of the transactions.

11. The SST of claim 1, where the processing module is configured to:
receive from the financial-transaction network information identifying one or more financial accounts owned by the user and a current balance for each of the accounts;
calculate a change in balance that will result in one or more of the accounts when the first one of the transactions is executed; and
deliver information indicating the change in balance that will result in the one or more accounts to the one or more user-interface devices for presentation to the user before initiating execution of the first one of the transactions.

12. The SST of claim 1, where the processing module is configured to deliver at least some of the information identifying the first one of the transactions and the second one of the transactions and the information containing the details necessary to complete the first one of the transactions and the second one of the transactions to the one or more user-interface devices for presentation of a transaction summary to the user before initiating execution of the first one of the transactions.

13. The SST of claim 1, where the processing module, in initiating execution of the transactions, is configured to initiate execution of the first one of the transactions before initiating execution of the second one of the transactions.

14. The SST of claim 1, where the processing module, in initiating execution of the transactions, is configured to initiate execution of the second one of the transactions before initiating execution of the first one of the transactions based upon the processing module automatically reordering execution in this manner utilizing reordering rules.

15. A self-service terminal (SST) for use in conducting multiple financial transactions with a user of the SST and a financial institution over a financial-transaction network, the SST comprising:
a user authentication device for authenticating the user once during a user session before entering a data entry stage in which the user provides transaction information relating to multiple financial transactions;
a video display for providing a list of types of transactions available to the user;
a user-input for selecting the type of transaction to be conducted;
upon a selection of a first transaction utilizing the user-input, the video display providing a list of accounts from which to select for the first transaction with the user-input;
a keypad for entering an amount involved in the first transaction;
the video display providing a display inquiring if a second transaction is desired upon completion of data entry for the first transaction;
upon an indication by the user that a second transaction is desired, the video display providing the list of types of transactions available to the user;
upon a selection of a second transaction utilizing the user-input, the video display providing a list of accounts from which to select for the second transaction;
the video display providing a display inquiring if a further transaction is desired upon completion of data entry for the first transaction;
upon an indication by the user that no further transactions are desired, the video display providing a summary of the transactions requested by the user during the user session and inquiring if any changes need to be made to the transactions requested; and
where no changes are requested, a processing module submitting the transactions requested for authorization and completing the transactions requested upon authorization.

16. The SST of claim 15 wherein the video display also provides a summary of the first transaction requested by the user and the affect that the first transaction will have on account balances of the accounts affected by the first transaction.

17. The SST of claim 16 wherein where the user indicates a change is needed, the video display provides a display asking the user which transaction to amend.

18. The SST of claim 17 wherein upon the user confirming any changes, the video display provides a revised summary of the transactions.

19. The SST of claim 16 wherein the transactions requested are reordered prior to submitting them for authorization utilizing programmable logic executably by the processing module.

20. A method for conducting multiple financial transactions between a user utilizing a self-service terminal (SST) and a financial institution over a financial-transaction network, the method comprising:
authenticating the user utilizing a user authentication device once during a user session before entering a data entry stage in which the user provides transaction information relating to multiple financial transactions;
displaying on a video display a list of types of transactions available to the user;

selecting the type of transaction to be conducted utilizing a user-input;

upon a selection of a first transaction utilizing the user-input, utilizing the video display to display a list of accounts from which to select for the first transaction with the user-input;

entering an amount involved in the first transaction utilizing a keypad;

providing a display on the video display inquiring if a second transaction is desired upon completion of data entry for the first transaction;

upon an indication by the user that a second transaction is desired, providing the list of types of transactions available to the user on the video display;

upon a selection of a second transaction utilizing the user-input, providing a list of accounts from which to select for the second transaction on the video display;

providing a display on the video display inquiring if a further transaction is desired upon completion of data entry for the first transaction;

upon an indication by the user that no further transactions are desired, providing a summary on the video display of the transactions requested by the user during the user session and inquiring if any changes need to be made to the transactions requested;

where no changes are requested, submitting the transactions requested for authorization and completing the transactions requested upon authorization utilizing a processing module;

where the user indicates a change is needed, providing a display on the video display asking the user which transaction to amend; and upon the user confirming any changes, the video display providing a summary of the transactions on the video display.

* * * * *